(12) United States Patent
Vu (10) Patent No.: US 9,109,732 B2
(45) Date of Patent: Aug. 18, 2015

(54) EZ-SEAL GASKET FOR JOINING FLUID PATHWAYS

(71) Applicant: Kim Ngoc Vu, Yorba Linda, CA (US)

(72) Inventor: Kim Ngoc Vu, Yorba Linda, CA (US)

(73) Assignee: VISTADELTEK, LLC, Yorba Linda, CA (US)

( * ) Notice: Subject to any disclaimer, the term of this patent is extended or adjusted under 35 U.S.C. 154(b) by 154 days.

(21) Appl. No.: 13/865,046

(22) Filed: Apr. 17, 2013

(65) Prior Publication Data

US 2014/0217681 A1    Aug. 7, 2014

Related U.S. Application Data

(60) Provisional application No. 61/687,105, filed on Apr. 18, 2012.

(51) Int. Cl.
| | |
|---|---|
| *F16J 15/06* | (2006.01) |
| *F16J 15/08* | (2006.01) |
| *F16L 23/20* | (2006.01) |
| *F16L 23/18* | (2006.01) |
| *F16L 23/16* | (2006.01) |
| *F16L 23/032* | (2006.01) |

(52) U.S. Cl.
CPC ............... *F16L 23/18* (2013.01); *F16J 15/061* (2013.01); *F16J 15/062* (2013.01); *F16J 15/08* (2013.01); *F16J 15/0881* (2013.01); *F16J 15/0887* (2013.01); *F16L 23/032* (2013.01); *F16L 23/16* (2013.01); *F16L 23/20* (2013.01)

(58) Field of Classification Search
CPC ......... F16J 15/06; F16J 15/061; F16J 15/062; F16J 15/08; F16J 15/0881; F16J 15/0887; F16J 15/10; F16J 15/104; F16L 17/06; F16L 17/067; F16L 17/08; F16L 19/0212; F16L 19/0218; F16L 23/032; F16L 23/16; F16L 23/18; F16L 23/20; F16L 23/22
USPC .......................... 277/637, 640–644, 648, 649
See application file for complete search history.

(56) References Cited

U.S. PATENT DOCUMENTS

| | | | | |
|---|---|---|---|---|
| 1,819,036 A | * | 8/1931 | Oberhuber | 285/363 |
| 1,848,307 A | * | 3/1932 | Boynton | 277/329 |
| 2,050,137 A | * | 8/1936 | Walsh | 285/331 |
| 3,208,758 A | | 9/1965 | Carlson et al. | |

(Continued)

FOREIGN PATENT DOCUMENTS

| | | |
|---|---|---|
| JP | 08-081968 A | 3/1996 |
| JP | 10-227363 A | 8/1998 |

OTHER PUBLICATIONS

International Search Report and Written Opinion issued Jan. 15, 2015, related PCT App. No. PCT/US2014/034256.

*Primary Examiner* — Kristina Fulton
*Assistant Examiner* — Nicholas L Foster
(74) *Attorney, Agent, or Firm* — Stout, Uxa & Buyan, LLP; Donald E. Stout (57) ABSTRACT

A malleable gasket suitable for high purity fluid delivery systems has flat axial end surface sealing regions on opposing sides, and further includes a raised inner lip on a first side and a raised outer lip on a second side. The raised lips align the gasket within a fluid delivery conduit by engaging features in the face of one or more fluid delivery elements joined together, and simultaneously provide protection to the sealing regions during normal handling and fluid delivery system assembly.

12 Claims, 4 Drawing Sheets

(56) References Cited

U.S. PATENT DOCUMENTS

| | | | | |
|---|---|---|---|---|
| 3,521,910 | A | 7/1970 | Callahan, Jr. et al. | |
| 3,909,019 | A | 9/1975 | Leko | |
| 3,930,656 | A | 1/1976 | Jelinek | |
| 4,168,852 | A * | 9/1979 | Ahlstone | 285/336 |
| 4,303,251 | A | 12/1981 | Harra et al. | |
| 4,854,597 | A | 8/1989 | Leigh | |
| 5,354,072 | A | 10/1994 | Nicholson | |
| 5,433,454 | A * | 7/1995 | Ramberg | 277/643 |
| 5,445,393 | A * | 8/1995 | Ramberg | 277/643 |
| 5,466,018 | A * | 11/1995 | Stobbart | 285/334.2 |
| 5,505,464 | A | 4/1996 | McGarvey | |
| 5,673,946 | A | 10/1997 | Barber et al. | |
| 5,730,448 | A | 3/1998 | Swensen et al. | |
| 5,758,910 | A | 6/1998 | Barber et al. | |
| 5,803,507 | A | 9/1998 | Vu | |
| 5,984,318 | A | 11/1999 | Kojima et al. | |
| 6,042,121 | A | 3/2000 | Ma et al. | |
| 6,123,338 | A | 9/2000 | Edelmann et al. | |
| 6,135,155 | A | 10/2000 | Ohmi et al. | |
| 6,357,760 | B1 | 3/2002 | Doyle | |
| 6,394,138 | B1 | 5/2002 | Vu et al. | |
| 6,409,180 | B1 | 6/2002 | Spence et al. | |
| 6,416,087 | B1 * | 7/2002 | Kremer | 285/328 |
| 6,688,608 | B2 | 2/2004 | Doyle | |
| 6,811,157 | B2 * | 11/2004 | Shinoda et al. | 277/608 |
| 6,845,984 | B2 | 1/2005 | Doyle | |
| 6,945,539 | B2 | 9/2005 | Whitlow et al. | |
| 7,004,479 | B2 * | 2/2006 | Oida et al. | 277/644 |
| 7,083,171 | B2 * | 8/2006 | Oida et al. | 277/644 |
| 7,140,647 | B2 | 11/2006 | Ohmi et al. | |
| 7,495,173 | B2 * | 2/2009 | Jung et al. | 174/91 |
| 7,581,764 | B2 * | 9/2009 | Ishihara | 285/336 |
| 8,033,579 | B2 * | 10/2011 | Takeda et al. | 285/367 |
| 8,628,094 | B2 * | 1/2014 | Tohdoh et al. | 277/644 |
| 8,662,504 | B2 * | 3/2014 | Kariya et al. | 277/616 |

* cited by examiner

EZ-SEAL GASKET FOR JOINING FLUID PATHWAYS

This application claims the benefit under 35 U.S.C. 119(e) of the filing date of Provisional U.S. Application Ser. No. 61/687,105, entitled EZ-Seal Gasket for Joining Fluid Pathway, filed on Apr. 18, 2012, which is commonly owned and expressly incorporated herein by reference, in its entirety.

FIELD OF THE INVENTION

The present invention is related to malleable metallic gaskets for sealing joints between portions of a fluid pathway.

BACKGROUND OF THE INVENTION

Many combinations of interface structures and associated gaskets are well known in the design of fluid delivery systems. These structures include flanges, glands, component connections, and other elements that enable mechanical assembly of various system elements forming an arrangement of interconnected fluid pathways.

Representative fluid delivery systems are found among industrial equipment producing fine chemicals, petroleum products, or semiconductors, for example, and may be subjected to vacuum or pressure or purity requirements and/or combinations thereof. Fluid pathways among elements intended for manipulating process materials within semiconductor manufacturing equipment usually require attention to maintaining high purity of the delivered reactants, and also typically have a much smaller cross-section than fluid pathways used in petrochemical plants, for example. In many cases, practitioners have found that metallic gaskets provide superior performance, particularly regarding diffusion of process fluid or contaminants through the gasket and consequent resistance to undesirable leakage, in preference over polymer materials.

One known type of fluid pathway joint uses a ring-shaped flat metallic gasket compressed between nominally identical shaped annular projections that surround circular conduit openings of opposing apparatus elements. The annular projections are urged axially toward one another, causing permanent plastic deformation of the ductile metallic gasket to create a seal that will resist leakage of even difficult-to-contain fluids such as helium. Representative examples of such joints may be seen, for example, in U.S. Pat. No. 3,208,758 issued to Carlson and Wheeler (familiarly known as the Varian® Conflat® flange), in U.S. Pat. No. 3,521,910 issued to Callahan and Wennerstrom (familiarly known as the Swagelok® VCR® fitting), and in U.S. Pat. No. 4,303,251, issued to Harra and Nystrom.

Another known type of fluid pathway joint uses a ring-shaped metallic gasket of complex shape compressed between nominally identical shaped annular projections that surround circular conduit openings of opposing apparatus elements. Representative examples of such joints are disclosed in U.S. Pat. No. 4,854,597 to Leigh, in U.S. Pat. No. 5,505,464 to McGarvey, and in U.S. Pat. No. 6,135,155 to Ohmi et al. (an early version of the W-seal joint type well known now in the industry). The '155 patent additionally provides a separate retainer for holding and centering the gasket during assembly of the joint. Such separate retainer structures may also be seen in U.S. Pat. No. 5,673,946 and U.S. Pat. No. 5,758,910, both issued to Barber and Aldridge, and in U.S. Pat. No. 7,140,647 to Ohmi et al.

Yet another known type of fluid pathway joint, familiarly known in the industry as the C-seal joint type, uses a ring-shaped metallic gasket of complex shape which is compressed between opposing apparatus elements, wherein the face of at least one element has a circular counterbore depression to receive the gasket. Representative examples of such joints are disclosed in, for example, U.S. Pat. No. 5,354,072 to Nicholson, U.S. Pat. No. 6,042,121, to Ma et al., U.S. Pat. No. 6,357,760 and U.S. Pat. No. 6,688,608, both issued to Doyle, and U.S. Pat. No. 6,409,180 issued to Spence and Felber. The '180 patent to Spence and Felber additionally discloses a separate retainer for holding and centering the gasket during joint assembly. Such separate retainer structures may also be seen in U.S. Pat. No. 5,730,448 to Swensen et al., U.S. Pat. No. 5,984,318 to Kojima and Aoyama, U.S. Pat. No. 6,845,984 to Doyle, and U.S. Pat. No. 6,945,539 to Whitlow et al.

Still another known type of fluid pathway joint, known in the industry as the Z-Seal type, uses a ring-shaped flat metallic gasket compressed between opposing apparatus elements wherein mating features surrounding circular conduit openings create corners that shear into the gasket. This type of corner-shear joint is illustrated in U.S. Pat. No. 5,803,507 and U.S. Pat. No. 6,394,138, both issued to the present inventor, Kim Ngoc Vu, and it also utilizes a retainer structure. All of the foregoing patents are herein expressly incorporated by reference, in their entirety.

In the majority of the preceding design examples, there is considerable risk of adversely scratching a face of the gasket prior to joint assembly and such damage thereby making a joint free of leaks unachievable. Gasket centering by a separate retainer provides a desirable consistency of alignment between the fluid pathway conduit ports and the central passageway through the gasket, but incurs undesirable added expense. Within some fluid delivery systems used for semiconductor manufacturing processes, there are situations using multiple types of pathway joints simultaneously, and that situation requires equipment maintenance personnel to stock and have available an undesirably large inventory of various kinds of spare gaskets.

SUMMARY OF THE INVENTION

In consideration of the foregoing, the present invention addresses the issues noted above, by providing an easily made single-piece malleable metallic gasket, incorporating protection of the sealing regions, that is also self-centering. The inventive gasket is a ring-shaped part which may be described as a torus generated by rotating a cross-sectional profile having specific characteristics about the central axis of the ring. The gasket form may be conveniently machined from solid stock or tubing using a lathe or screw machine, but other manufacturing processes, such as stamping or coining in conjunction with appropriate annealing, are also contemplated. It will be apparent to practitioners that the benefits of sealing region protection and self-centering may also be obtained with gaskets made by molding or machining polymer materials such as PFA, but the resistance to diffusion of process fluid or contaminants will be reduced.

The gasket torus typically has an inner diameter corresponding to roughly the inner diameter of the fluid pathway conduits, and an outer diameter proscribed by constraints of the mating apparatus elements. The gasket torus has a first axial end surface sealing region that is orthogonal to the axis of the gasket central fluid pathway hole, and is generally flat. The gasket torus also has a second axial end surface sealing region, opposite the first axial end surface sealing region, that is orthogonal to the axis of the gasket central fluid pathway hole and is also generally flat. The first axial end surface sealing region surrounds an inner raised lip of sufficient axial extent to protect the first end surface sealing region, and has a diameter smaller than the first sealing region. The second axial end surface sealing region is surrounded by an outer raised lip of sufficient axial extent to protect the second end surface sealing region, and has a diameter greater than the second sealing region. The inner raised lip and outer raised lip may each extend axially a convenient distance (such as 0.010 inch) beyond the corresponding adjacent sealing region. The inner raised lip and outer raised lip may have most any convex profile, but a smoothly curved outermost portion with tapering sides is easily machined, and minimizes the chances for snagging or scraping the gasket during fluid delivery assembly in clean room conditions typically used for semiconductor equipment. The gasket form may be conveniently machined from solid stock, such as round bar stock, or tubing using a lathe or screw machine, but other manufacturing processes, such as stamping or coining in conjunction with appropriate annealing, are also contemplated. It will be apparent to practitioners that the benefits of sealing region protection and self-centering may also be obtained with gaskets made by molding or machining polymer materials such as PFA, but the resistance to diffusion of process fluid or contaminants will be reduced. The round bar stock, when used, may be stainless steel or other suitable material, such as Hastelloy C276 or C22.

Gaskets intended for use with corner-shear joint types will usually have the inner diameter of the flat first axial end surface sealing region be nominally the same as the outer diameter of the flat second axial end surface sealing region. Another embodiment of the gasket may have the inner diameter of the flat first axial end surface sealing region be nominally the same as the outer diameter of the flat second axial end surface sealing region. Another embodiment of the gasket may have the inner diameter of the first sealing surface be less than the outer diameter of the second sealing surface to ease use with VCR® joint types. A useful variation of the inventive gasket lacks any hole piercing the material of the gasket and thus may function as a blank-off closure that prevents flow through a fluid conduit as is known in the art. A further variation of the inventive gasket has one or more small holes piercing the material of the gasket, rather than a large central hole, and thus may function to reduce or limit flow through a fluid conduit as is also known in the art (see U.S. Pat. No. 7,874,208 for an example application of this function using a corner-shear joint type).

More particularly, there is provided in a disclosed inventive embodiment a malleable gasket suitable for high purity fluid delivery systems. The gasket comprises a first side, an opposed second side, and an outer circumference, and further comprises a raised inner lip on the first side and a raised outer lip on the second side, wherein the raised inner lip and the raised outer lip are circumferentially spaced from one another. In the illustrated embodiments, the gasket is round. It may be metallic, or alternatively made from a polymer. A metallic version of the gasket may be machined from a round bar stock, such as stainless steel or hastelloy.

The first side of the gasket comprises a flat first sealing region disposed outwardly of the raised inner lip, while the second side of the gasket comprises a flat second sealing region disposed inwardly of the raised outer lip. As illustrated, the first side of the gasket is a mirror image of the second side of the gasket. The first side of the gasket further comprises a circular sector forming a part of the raised inner lip, an outward tapering portion extending from the circular sector, and a smooth curve extending outwardly from the tapering portion and joining the flat first sealing region. The second side of the gasket further comprises a circular sector forming a part of the raised outer lip, an inwardly tapering portion extending from the circular sector, and a smooth curve extending inwardly from the tapering portion and joining the flat second sealing region. The gasket comprises a torus having an inner circumference defining a central axial bore, and each of the flat first sealing region and the flat second sealing region are substantially orthogonal to the axis of the central axial bore.

The gasket is disposed in a sealing arrangement within a fluid passageway formed by assembled members having a joint comprising each of a joint counterbore portion and a joint groove portion, a counterbore corner extending from the joint counterbore portion and a groove portion corner extending from the joint groove portion, and further wherein the inner raised lip aligns the gasket with the joint counterbore portion and the outer raised lip aligns the gasket with the joint groove portion, such that when the joint is completely assembled, the counterbore corner shears into the gasket first sealing region and the groove portion corner shears into the gasket second sealing region.

The invention, together with additional features and advantages thereof, may be best understood by reference to the following description taken in conjunction with the accompanying illustrative drawings. In these accompanying drawings, like reference numerals designate like parts throughout the figures.

BRIEF DESCRIPTION OF THE DRAWINGS

FIG. 1a is a top view of a gasket constructed in accordance with one embodiment of the present invention;

FIG. 1b is a cross-sectional view taken along line A-A of the gasket shown in FIG. 1a;

FIG. 2 is an enlarged detail of the portion of FIG. 1b identified by the letter "B";

DETAILED DESCRIPTION OF THE INVENTION

Referring now more particularly to the drawing figures, wherein like reference numerals designate identical or corresponding parts throughout the several views and embodiments, there is shown in FIGS. 1*a*-1*c* and FIG. 2 one embodiment of a gasket 10 constructed in accordance with the principles of the present invention. The gasket 10 has an inner raised lip 20 and a smooth straight central axial bore 40, wherein the inner raised lip 20 begins as a nominally 30 degree outward taper 21 therefrom. Upon reaching an axial extent of approximately 0.007", the outward taper 21 turns into a smooth curve directed outwardly with a radius of approximately 0.006" to form a circular sector 22 of approximately 90 degrees extent, and then begins a further outward taper 23 of nominally 45 degrees in the reverse axial direction. Upon nearly reaching the same axial location as the start of the outward taper 21, the further outward taper 23 turns into a smooth curve 24, which is directed further outward with a radius of approximately 0.004", and joints a flat first axial end surface region 30 that is orthogonal to the axis of the gasket central axial bore 40 which defines the fluid pathway hole. The flat first sealing region 30 extends radially approximately 0.005" outward, then turns into a smooth curve directed outwardly with a radius of approximately 0.020", forming a circular sector 26 of approximately 90 degrees extent, whereupon the straight wall of a gasket outside diameter 50 is formed parallel to the central axis.

In the foregoing embodiment, the profile of an outer raised lip 60 and flat second sealing region 70 transition from the gasket outside diameter 50 are mirror images of the corresponding inner raised lip 20 and flat first sealing region 30. The gasket 10 has a smooth straight outside diameter 50 and an outer raised lip 60, beginning as a nominally 30 degree inward taper 61 therefrom. Upon reaching an axial extent of approximately 0.007", the inward taper 61 turns into a smooth curve, directed inwardly with a radius of approximately 0.006", forming a circular sector 62 of approximately 90 degrees extent, and then begins a further inward taper 63 of nominally 45 degrees in the reverse axial direction. Upon nearly reaching the same axial location as the start of the 30 degree taper 61, the further inward taper 63 turns into a smooth curve 64 directed further inwardly with a radius of approximately 0.004" and joins the flat axial second end surface sealing region 70 that is orthogonal to the axis of the gasket central axial bore 40 which defines the fluid pathway hole. The flat second sealing region 70 extends radially approximately 0.005" inwardly, then turns into a smooth curve directed inwardly with a radius of approximately 0.020" forming a circular sector 66 of approximately 90 degrees extend, whereupon the straight wall of the gasket smooth central axial bore 40 is formed parallel to the central axis.

Figures 1A, 1B, 2:
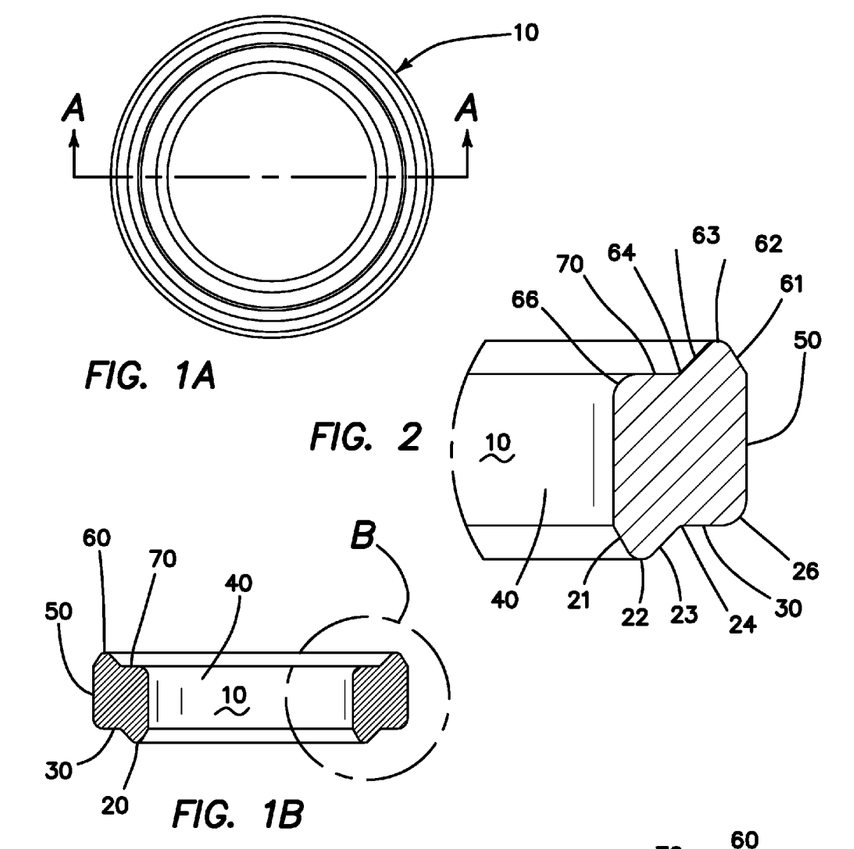
Figure 1C:
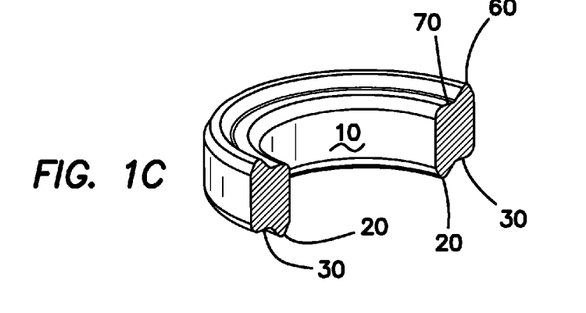
FIG. 1c is an isometric view of a portion of the gasket of FIGS. 1a and 1b.
Figure 3A:
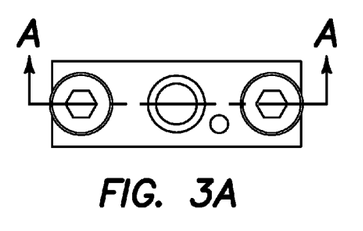
FIG. 3a is a top view of a portion of a fluid delivery system having planar corner-shear fluid delivery elements and using the gasket of the present invention.
Figure 3B:
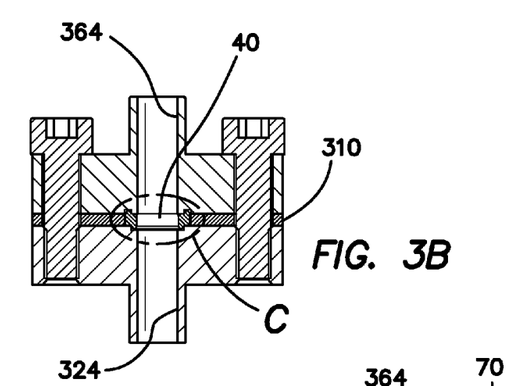
FIG. 3b is a cross-sectional view of the system of FIG. 3a, taken along line A-A.
Figure 3C:
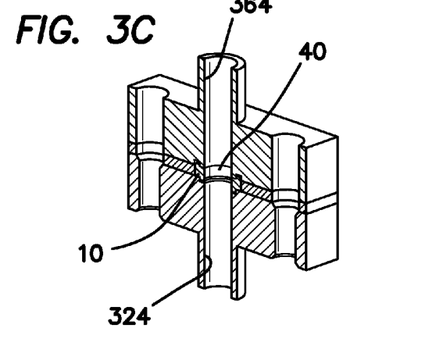
FIG. 3c is an isometric cross-sectional view of the system of FIGS. 3a and 3b.
Figure 3D:
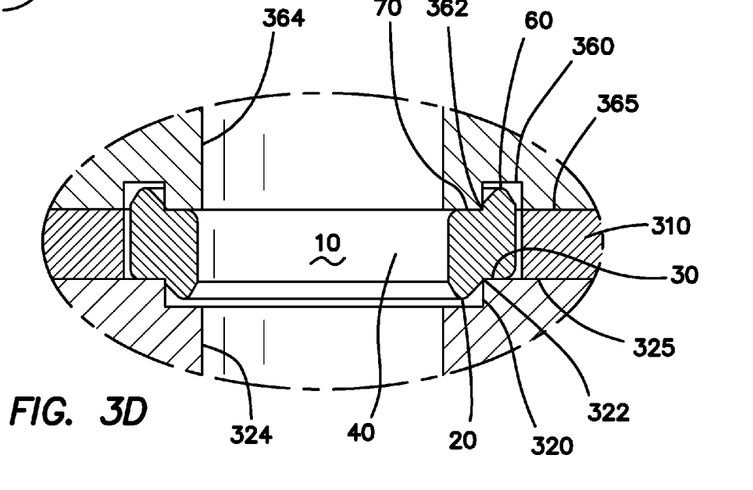
FIG. 3d is an enlarged cross-sectional view of the portion of FIG. 3b denoted by the letter "C"
Figures 4A, 4B, 4C:
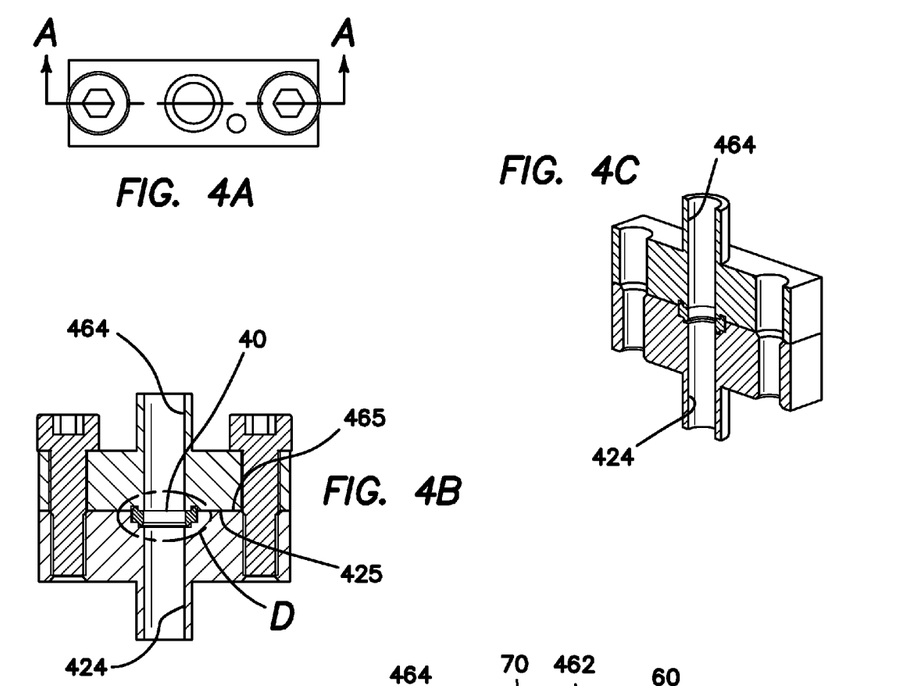
FIG. 4a is a top view of a portion of a fluid delivery system having a combination of recessed and planar corner-shear joint fluid delivery elements and using the gasket of the present invention.
FIG. 4b is a cross-sectional view of the system of FIG. 4a, taken along line A-A.
FIG. 4c is an isometric cross-sectional view of the system of FIGS. 4a and 4b.
Figure 4D:
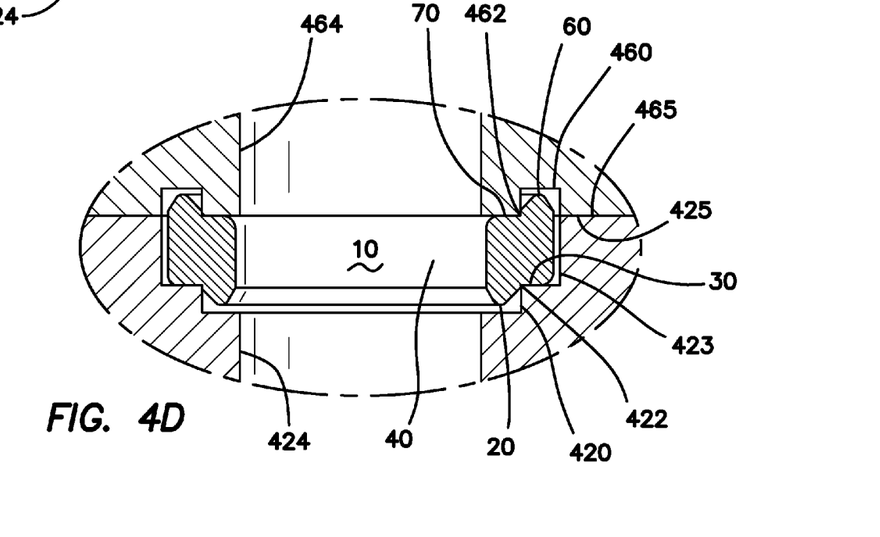
FIG. 4d is an enlarged cross-sectional view of the portion of FIG. 4b denoted by the letter "D"
Figure 5A:
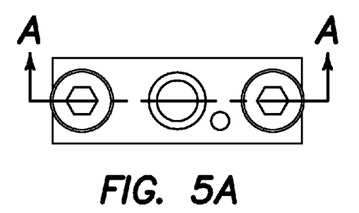
FIG. 5a is a top view of a portion of a fluid delivery system with yet other recessed corner-shear joint fluid delivery elements and using the gasket of the present invention.
Figure 5B:
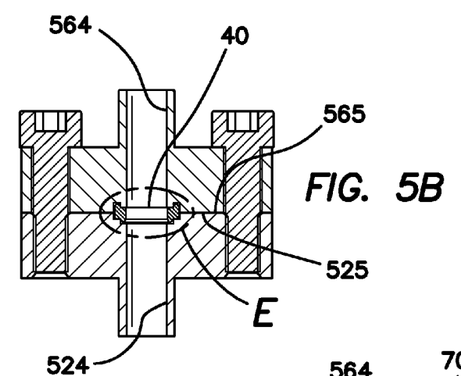
FIG. 5b is a cross-sectional view of the system of FIG. 5a, taken along line A-A.
Figure 5C:
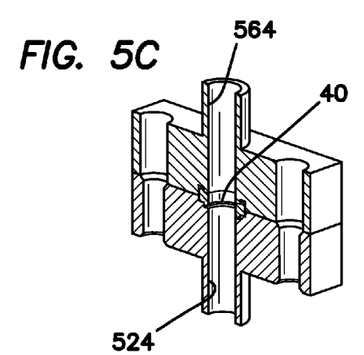
FIG. 5c is an isometric cross-sectional view of the system of FIGS. 5a and 5b.
Figure 5D:
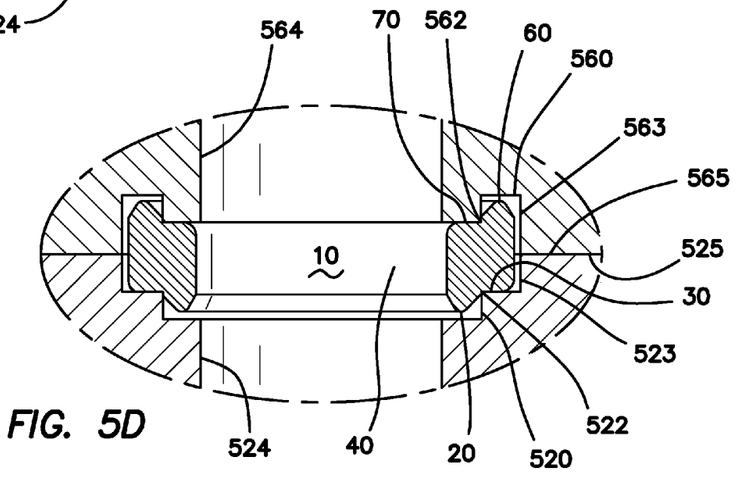
FIG. 5*d* is an enlarged cross-sectional view of the portion of FIG. 5*b* denoted by the letter "E".

The axial spacing between the first sealing region 30 and the second sealing region 70 may be chosen for convenience according to particular dimensions of the corresponding apparatus elements wherein the gasket will be used. In the illustrated embodiment, an axial spacing of approximately 0.058" allows the gasket to be used with planar corner-shear joint types intended to provide a nominal gasket compression of 0.012" when completely assembled. It should be appreciated that the corner-shear joint mating features may be located at various recessed axial depths within the corresponding apparatus elements, and the same one embodiment may be used with these different combinations.

The gasket 10 may be conveniently machined from solid stock, such as round bar stock, or tubing using a lathe or screw machine, but other manufacturing processes, such as stamping or coining in conjunction with appropriate annealing, are also contemplated. It will be apparent to practitioners that the benefits of sealing region protection and self-centering may also be obtained with gaskets made by molding or machining polymer materials such as PFA, but the resistance to diffusion of process fluid or contaminants will be reduced. The round bar stock, when used, as presently preferred, may be stainless steel or other suitable material, such as Hastelloy C276 or C22.

As shown in FIGS. 3*a*-3*d*, the inventive gasket 10 may be used with planar corner-shear joint mating features similar to those disclosed in U.S. Pat. Nos. 5,803,507 or 6,394,138 wherein the inner raised lip 20 aligns the gasket 10 with a joint counterbore portion 320 and the outer raised lip 60 aligns the gasket 10 with a joint groove portion 360. When the joint is completely assembled, a counterbore corner 322 shears into the gasket first sealing region 30 and a groove portion corner 362 shears into the gasket second sealing region 70. The gasket central axial bore 40 has approximately the same diameter as an upper element conduit port 364, which usually also has the same diameter as a lower element conduit port 324. In this design, the upper and lower device conduit ports 364, 324 usually have the corner features 362, 322 sharpened by lapping the flat surface of the joined elements, which necessarily places the corner features 362, 322 at opposing interface surfaces 365, 325. The joint is best assembled by interposing a thick shim 310 between the opposing interface surfaces 365, 325 to ensure the desired compression (typically 0.012") of the gasket 10 is achieved and also to provide a hard stop when the full fastener force is applied.

As shown in FIGS. 4*a*-4*d*, the inventive gasket 10 may be used with corner-shear joint mating features, wherein some element features have been recessed. As before, the inner raised lip 20 aligns the gasket 10 with a joint counterbore portion 420 and the outer raised lip 60 aligns the gasket 10 with a joint groove portion 460. When the joint is completely assembled, a counterbore corner 422 will shear into the gasket first sealing region 30 and a groove portion corner 462 will shear into the gasket second sealing region 70. The gasket central axial bore 40 has approximately the same diameter as an upper element conduit port 464, which usually also has the same diameter as a lower element conduit port 424. In this alternate apparatus design, the lower device conduit port 424 has a joint counterbore portion 420 and its corner feature 422 placed within a slightly larger counterbore 423 and recessed below a lower element surface 425. Within the included planar upper element design, the joint groove portion 460 corner feature 462 may optionally be sharpened by lapping the flat surface of the upper element. The joint is assembled without any shim between the opposing interface surfaces 465, 425, since the desired compression (typically 0.012") of the gasket 10 is achieved by selecting the depth of the larger counterbore 423, and a hard stop still occurs when the full fastener force is applied. A similar combination of planar lower element design and recessed upper element design can also be implemented, but is not illustrated in the interest of brevity.

As shown in FIGS. 5*a*-5*d*, the inventive gasket 10 may be used with corner-shear joint mating features wherein element features have been symmetrically recessed. As before, the inner raised lip 20 aligns the gasket 10 with a joint counterbore portion 520 and the outer raised lip 60 aligns the gasket 10 with a joint groove portion 560. When the joint is completely assembled, a counterbore corner 522 will shear into the gasket first sealing region 30 and a groove portion corner 562 will shear into the gasket second sealing region 70. The gasket central axial bore 40 has approximately the same diameter as an upper element conduit port 564, which usually also has the same diameter as a lower element conduit port 524. In this other alternative apparatus design, the lower device conduit port 524 has the joint counterbore portion 520 and its corner feature 522 placed within a slightly larger additional counterbore 523 and recessed below an element surface 525. Likewise, the upper device conduit port 564 has the joint groove portion 560 and its corner feature 562 placed within a deeper additional counterbore 563 and recessed above an element surface 565. The joint is assembled without any shim between the opposing interface surfaces 525, 565 since the desired compression (typically 0.012") of the gasket 10 is achieved by selecting the depth of the matching additional counterbores 523, 563 and a hard stop still occurs when the full fastener force is applied.

Practitioners skilled in the art may further appreciate that the inner raised lip 20 and the outer raised lip 60 are radially displaced with respect to one another (as may be seen in FIG. 2) in all embodiments of the inventive gasket 10, because they originate from opposing edges of the sealing regions 30, 70. Inadvertent virtual leaks and contamination traps within the fluid pathway are avoided by the smooth open form of the inward circular sector 66 adjacent to the axial bore 40 and also the smooth form of the inner raised lip 20 beginning as the nominally 30 degree outward taper 21.

While this application examples and embodiments, it is to be understood that various modifications may be made without departing from the scope thereof. Therefore, the above description should not be construed as limiting the invention, but merely as an exemplification of preferred embodiments thereof and that the invention can be variously practiced within the scope of the following claims.

What is claimed is:

1. A joint comprising first and second members defining a fluid passageway and a gasket disposed within the fluid passageway and installed in sealing arrangement between the first and second members, the joint further comprising each of a joint counterbore portion and a joint groove portion, a counterbore corner extending from the joint counterbore portion and a groove portion corner extending from the joint groove portion;
wherein the gasket is a malleable gasket suitable for high purity fluid delivery systems, the gasket comprising a first side, an opposed second side, an outside diameter, and an inside diameter, the first side comprising a first circular sector extending inwardly from the outside diameter to a flat first sealing region, the flat first sealing region extending inwardly to a raised inner lip, the second side comprising a raised outer lip extending inwardly from the outside diameter to a flat second sealing region, the flat second sealing region extending inwardly to the inside diameter such that there are no protrusions disposed on the second side between the flat second sealing region and the inside diameter, wherein the raised inner lip and the raised outer lip are circumferentially spaced from one another, and further wherein the raised inner and outer lips are adapted to align the gasket by engaging features in a face of one or more fluid delivery elements being joined; and further wherein the inner raised lip aligns the gasket with the joint counterbore portion and the outer raised lip aligns the gasket with the joint groove portion, such that when the joint is completely assembled, the counterbore corner shears into the gasket first sealing region and the groove portion corner shears into the gasket second sealing region.

2. The joint as recited in claim 1, wherein the gasket is round.

3. The joint as recited in claim 1, wherein the gasket is metallic.

4. The joint as recited in claim 3, wherein the gasket is machined from a round bar stock.

5. The joint as recited in claim 4, wherein the round bar stock comprises a corrosion-resistant metal alloy.

6. The joint as recited in claim 1, wherein the gasket is made entirely from a polymer.

7. The joint as recited in claim 1, wherein the gasket comprises a torus having an inner circumference defining a central axial bore.

8. The joint as recited in claim 1, wherein the first side of the gasket is a mirror image of the second side of the gasket.

9. The joint as recited in claim 1, wherein on the first side of the gasket the first circular sector is disposed directly between the outside diameter and the flat first sealing region, and the flat first sealing region is disposed directly between the first circular sector and the raised inner lip.

10. The joint as recited in claim 9, wherein on the second side of the gasket the raised outer lip is disposed directly between the outside diameter and the flat second sealing region and the flat second sealing region is disposed directly between the raised outer lip and the inside diameter.

11. The joint as recited in claim 1, wherein the gasket comprises a torus wherein the inside diameter defines a central axial bore, and each of the flat first sealing region and the flat second sealing region are substantially orthogonal to the axis of the central axial bore.

12. A fluid pathway joint comprising:
an upper apparatus element having an upper element conduit port, said upper element conduit port having a groove with a right-angle corner shear portion;
a lower apparatus element having a lower element conduit port, said lower element conduit port having a counterbore; and
A gasket disposed between the upper element conduit port and the lower element conduit port in sealing arrangement;
the gasket being a malleable gasket suitable for high purity fluid delivery systems, the gasket comprising a first side, an opposed second side, an outside diameter, and an inside diameter, the first side comprising a first circular sector extending inwardly from the outside diameter to a flat first sealing region, the flat first sealing region extending inwardly to a raised inner lip, the second side comprising a raised outer lip extending inwardly from the outside diameter to a flat second sealing region, the flat second sealing region extending inwardly to the inside diameter such that there are no protrusions disposed on the second side between the flat second sealing region and the inside diameter, wherein the raised inner lip and the raised outer lip are circumferentially spaced from one another, and further wherein the raised inner and outer lips are adapted to align the gasket by engaging features in a face of one or more fluid delivery elements being joined;
wherein the gasket inner raised lip aligns the gasket with the right angle corner-shear portion of the lower element conduit port counterbore, and the outer raised lip aligns the gasket with the right angle corner-shear portion of the upper element conduit port groove;
such that when the joint is completely assembled wherein the upper and lower apparatus elements abut against a hard stop, the conduit port counterbore corner shears into the gasket flat first sealing region and the conduit port groove corner shears into the gasket flat second sealing region.

* * * * *